United States Patent

Farshad

[11] Patent Number: 5,704,233
[45] Date of Patent: Jan. 6, 1998

[54] ANTI-THEFT DEVICE FOR VEHICLES

[76] Inventor: Fred F. Farshad, 405 Shelly Dr., Lafayette, La. 70503

[21] Appl. No.: 643,373

[22] Filed: May 6, 1996

[51] Int. Cl.$^6$ .................................. E05B 65/12
[52] U.S. Cl. ........................ 70/238; 70/199; 70/209
[58] Field of Search ........................ 70/14, 18, 19, 70/209–212, 225, 226, 237, 238, 198–200

[56] References Cited

U.S. PATENT DOCUMENTS

| | | | |
|---|---|---|---|
| 2,716,336 | 8/1955 | Ross | 70/238 |
| 3,190,090 | 6/1965 | Zaidener | 70/238 X |
| 3,435,646 | 4/1969 | Michnoff | 70/238 X |
| 4,779,435 | 10/1988 | Frarow | 70/199 X |
| 5,157,951 | 10/1992 | Chen et al. | 70/226 X |
| 5,259,222 | 11/1993 | Jang | 70/209 |
| 5,267,458 | 12/1993 | Heh | 70/199 X |
| 5,329,793 | 7/1994 | Chen | 70/209 |
| 5,363,679 | 11/1994 | Prasad | 70/209 |
| 5,460,021 | 10/1995 | Taylor | 70/238 X |
| 5,471,855 | 12/1995 | Wu | 70/209 |
| 5,491,990 | 2/1996 | Von-Lambert | 70/209 |
| 5,513,506 | 5/1996 | Ricalde | 70/209 |

FOREIGN PATENT DOCUMENTS

| | | | |
|---|---|---|---|
| 850440 | 8/1981 | U.S.S.R. | 70/238 |

*Primary Examiner*—Suzanne Dino
*Attorney, Agent, or Firm*—C. Dean Domingue

[57] ABSTRACT

An anti-theft device for vehicles is disclosed. Generally, the device includes a catch member adapted to catch onto a brake pedal located within the vehicle; a rod member extending from the catch member; an attachment member, fixedly mounted on a second rod, adapted to attach to a steering wheel located within the vehicle; and, a locking apparatus, operably associated with the attachment member, for locking the attachment member onto the steering wheel. The device will also contain a folding joint adapted to connect the rod sections so that the rod sections may be folded when said device is not in use. In the preferred embodiment, the device also contains an adjusting member, cooperating with the rod sections for adjusting the length of the rod according to the dimensions of the vehicle.

4 Claims, 4 Drawing Sheets

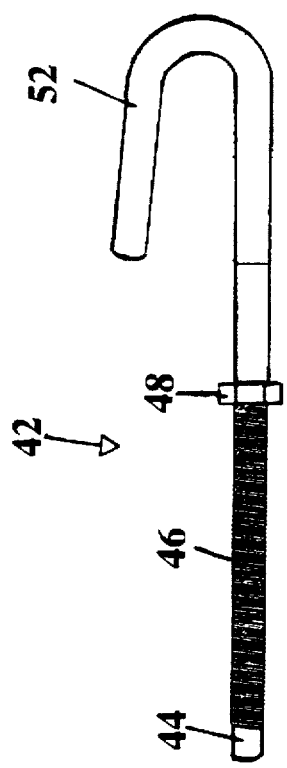
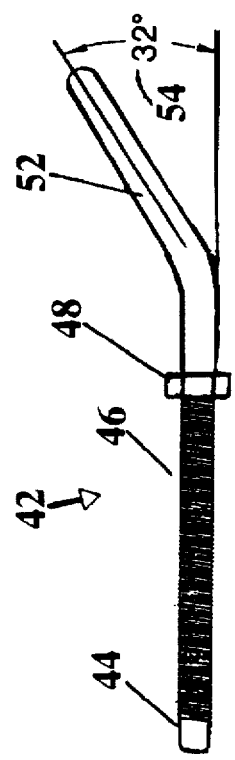
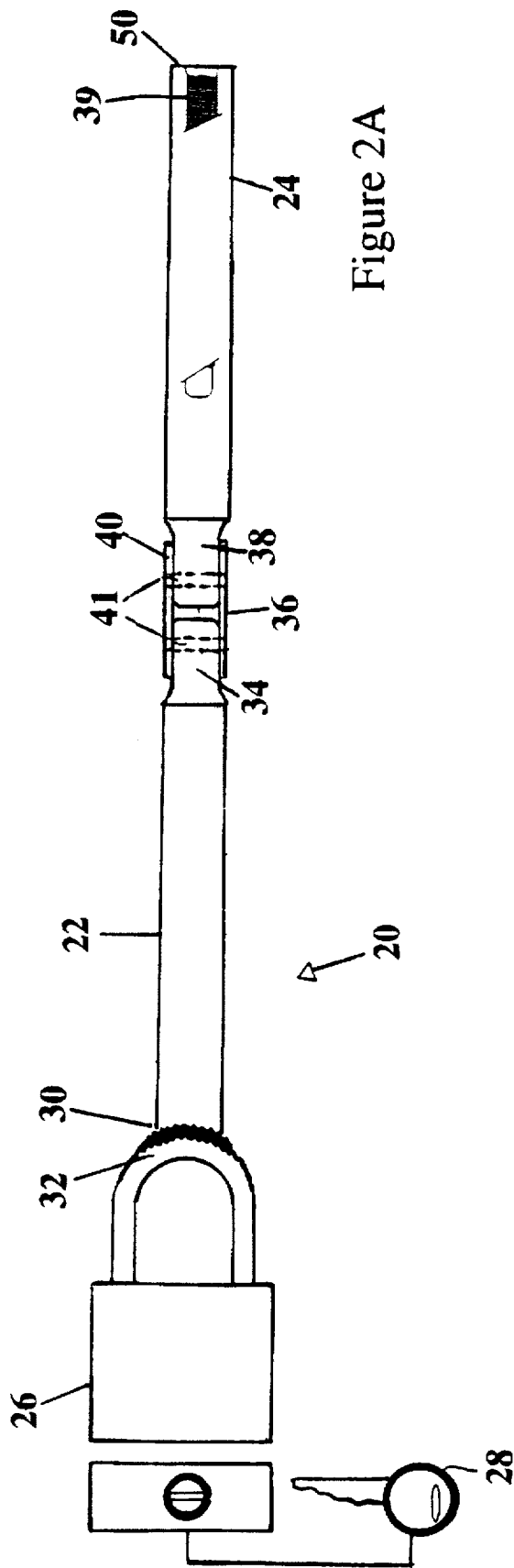

ANTI-THEFT DEVICE FOR VEHICLES

The invention relates to a device used for vehicle safety. More particularly, but not by way of limitation, this invention relates to a device that is used to eliminate the theft of automobiles.

BACKGROUND OF THE INVENTION

The theft of automobiles has become a serious problem. While a vehicle is left unattended, many people will lock their vehicles in order to deter theft of the automobile and/or the contents therein. However, thieves can break the windows. Once inside, the thief may unlatch the hood and manipulated the starter thereby causing ignition of the engine. Once the automobile is started, the thief may drive the car off.

In order to deter this type of situation, various devices have been developed. One such device utilizes a telescoping rod with hooking prongs located on either side. The hooking prongs are extended into engagement with the steering wheel by the operator extending the telescoping rod. The telescoping rod can then be locked into place. Thus, if the thieve attempts to drive, the rod will halt the successful rotation of the steering wheel. Prior art devices of this type include "The Club" (believed to be a trademark of Winner International Corporation) and the "The Steering Wheel Lock" (believed to be a trademark of Blazer International of Illinois).

However, these prior art devices all suffer from various deficiencies. For instance, the rod members of the prior art devices are generally elongated; therefore, storage and handling of the device is difficult. Further, the hooking prong of the prior art devices do not actually encircle the steering wheel. Thus, it is possible to bend the steering wheel so as to free the hooking prong.

The invention of the present application solves these, and other problems, by having a device that is capable of folding Further, the novel apparatus herein disclosed provides for a locking mechanism about the steering wheel.

SUMMARY OF THE INVENTION

An apparatus for deterring automobile theft is disclosed. The invention includes a hooking means for hooking onto the brake. A rod member extends from the hooking means and is connected to attaching means for attaching the rod member onto the steering wheel. The apparatus will further contain locking means, operably associated with the attaching means, for locking the attaching means onto the steering wheel. In the preferred embodiment, the apparatus further contains adjusting means, cooperating with the rod member, for adjusting the length of the rod member according to the dimensions of the automobile.

In one embodiment, the rod member comprises a first member and a second member, and the apparatus further comprises a folding joint means, operatively associated with the first rod member and the second rod member, for folding the first rod member relative to the second rod member.

In another embodiment, the hook means may contain a first end containing a hook and a second end containing thread means. The first rod member will then contain thread means and wherein the adjusting means includes thread means of the hook cooperating with the thread means of the first rod member so that the length of the rod may be varied according to the dimensions of the vehicle.

In yet another embodiment, the hook means has a first end containing a hook and a second end containing a serration thread profile. In this embodiment, the first rod member contains a serration thread profile and the adjusting means includes a serration thread profile. Thus, the hook cooperates with the serration thread profile of the first rod member so that the length of the rod may be varied according to the dimensions of the vehicle.

The locking means included in this invention consist of a combination lock means for unfastening the lock, or alternatively, a key lock. The type of lock will depend on the preference of the automobile owner.

An advantage of the present invention includes the apparatus may be folded into pieces thereby allowing for easy storage as well as handling. For instance, the novel apparatus herein disclosed may fit underneath the seat of the vehicle. Another advantage includes the attaching means encircling the steering wheel, and thereafter, locking the attaching means into place. Yet another advantage includes the simple design makes the operation and positioning of the novel device simple and quick.

A feature of the present invention includes the hook means attaching about the brake pedal. Another feature includes the folding joint which connects a first rod section with a second rod section. Another feature includes the option of having a combination lock or key lock to hold the attaching means onto the steering wheel.

BRIEF DESCRIPTION OF THE FIGURES

FIGS. 2A, 2B, and 2C are sectional views of one embodiment of the apparatus for deterring vehicle theft of the present invention.

DETAILED DESCRIPTION OF THE PREFERRED EMBODIMENTS

Figure 1C:
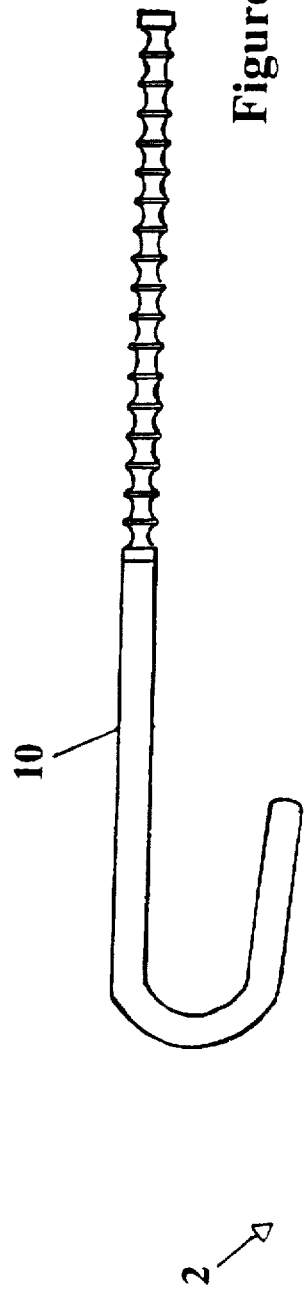
FIGS. 1A, 1B, and 1C are sectional views of a prior art device.
Figure 1B:
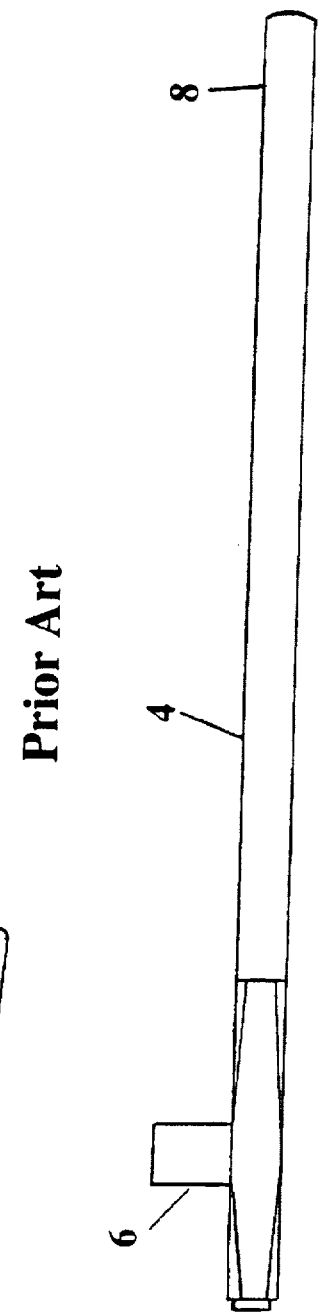
Figure 1A:
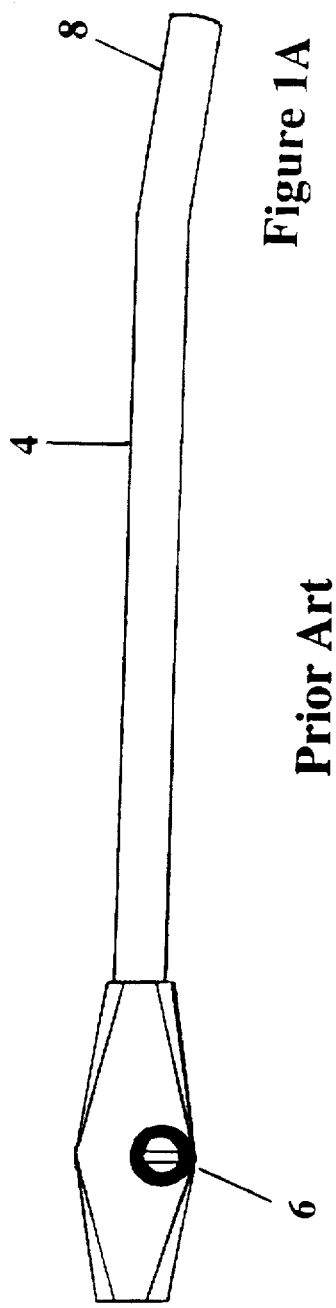

Referring now to FIGS. 1A, 1B, and 1C, sectional views of a prior art device 2 is depicted. Thus, the prior device 2 contains a rod member 4 that has at one end a key lock means 6 and at the second end a hook member 8. The hook member 8 is adapted to fit about the steering wheel of the vehicle (not shown). As shown, the hook member has a slight angled deviation.

FIG. 1B depicts the side view of the prior art device 2, which allows depict the profile of the key lock means 6. In FIG. 1C, the rod extension 10 is illustrated, with one end of the rod extension having a serrated thread profile 12. The other end of the rod extension 10 contains the hook 14. The device seen in FIGS. 1A–1C and believed to be sold under the trademark "Steering Wheel Lock" to Rally Manufacturing Incorporated suffer from deficiencies as pointed out earlier.

Referring now to FIGS. 2A, 2B, and 2C, a sectional views of one embodiment of the apparatus 20 for deterring vehicle theft of the present invention will now be described. With reference to FIG. 2A, the apparatus 20 contains a rod member having first rod member 22 and a second rod member 24. The first rod member 22 has connected to it attaching means 26 for attaching the rod member 22, 24 onto the steering wheel of the automobile. As seen in FIG. 2A, the attaching means is a key lock mechanism 26 that has a key 28 that the operator will use in order to lock and unlock about the steering wheel. It should be understood that other types of locking mechanism may be employed such as combination locks. The actual type of locking mechanism will depend on the preference of the operator i.e. would the operator prefer carrying a key or memorizing a combination.

The first rod member 22 will have a first end 30 attached to the loop 32 of lock 26, as shown. The second end 34 of the first rod member 22 will be attached to a folding joint means 36, with the folding joint means 36 serving to join the rod member 22 with the rod member 24. Thus, the second rod member 24 will have a first end 38 attached to the folding joint means 36. The rod member 24 also contains the internal thread means 39. The folding joint means 36, in the preferred embodiment, comprises a "U" member 40 that has pinned therein the ends 34 and 38 with the pins 41 positioned through apertures within the ends 34, 38. The pins 41 are in turn connected to the "U" member 40. Thus, when the apparatus 20 is not in use, the operator may fold the first rod member 22 together with the second rod member 24. This enables the operator to store the apparatus 26 in compact areas. It also makes the transportation of the apparatus 20 more feasible.

Referring now to FIG. 2B, the adjusting means 42 for adjusting the length of the rod members 22, 24 according to the dimensions of the automobile is shown. The adjusting means 42 contains a first cylindrical section 44 that has thereon external thread means 46 that will cooperate with the internal thread means 39. As will be understood by those of ordinary skill in the art, the external thread means 46 will be screwed into the second rod member 24, the total length of the rod member can be shortened. Thus, the length is adjusted to the specific length for the automobile.

The embodiment of FIG. 2B also contains a bolt 48 that is fastened onto the shoulder 50 of the second rod member 24. The cylindrical section extends to the hooking means 52 for hooking onto the brake pedal. By the operator fastening the bolt 48 against the shoulder 50, the rod members 22, 24 are fastened into place. As depicted, the hooking means 52 deviates from the axial orientation of the cylindrical section 44 represented by the numeral 54 which in the preferred embodiment is an angle of deflection of 32 degrees. This angle is necessary in order to properly grasp the brake pedal. FIG. 2C depicts the actual hook member 52.

Figure 3A:
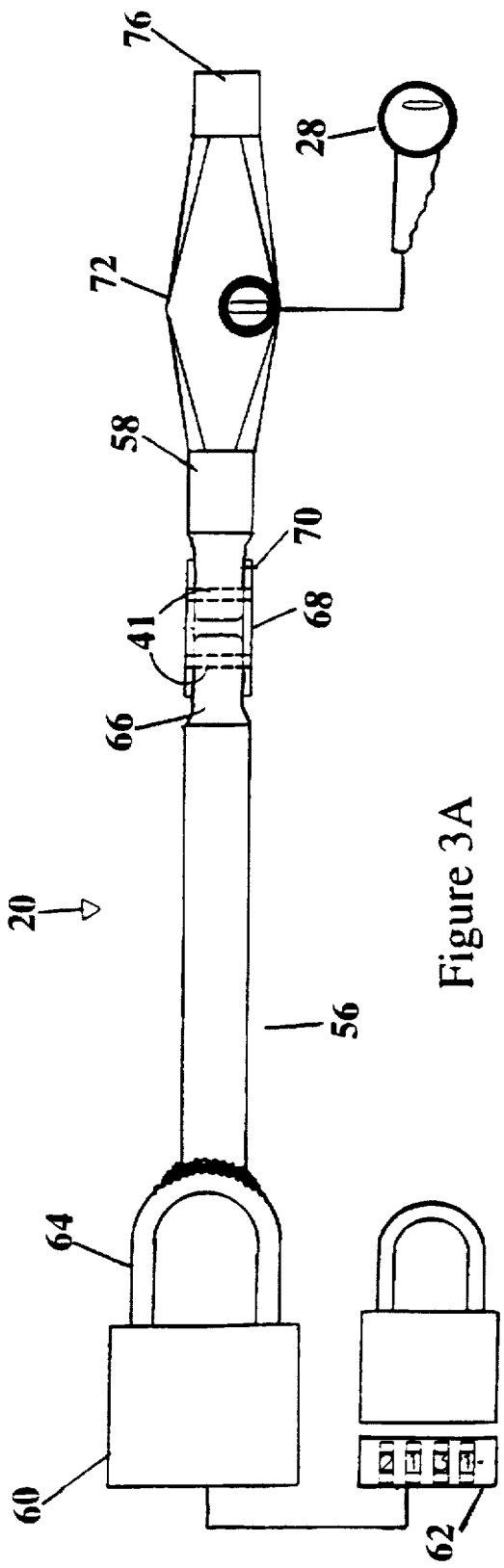
FIGS. 3A, 3B, and 3C are sectional views of the preferred embodiment of the apparatus for deterring vehicle theft of the present invention.
Figure 3B:
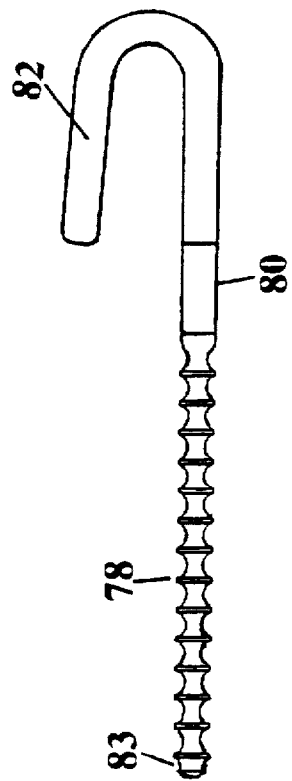
Figure 3C:
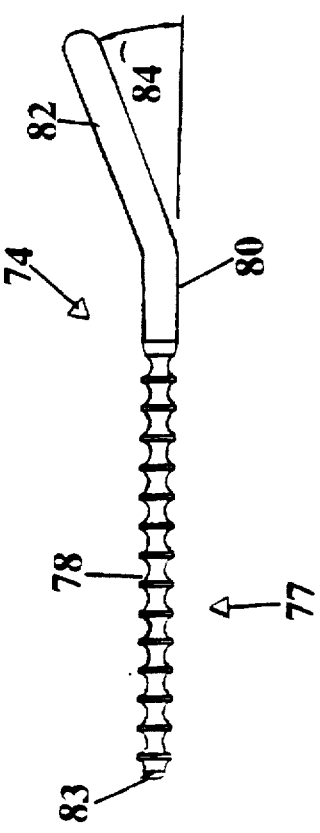

Referring to FIGS. 3A, 3B, and 3C, sectional views of the preferred embodiment of the apparatus for deterring vehicle theft of the present invention is shown. In FIG. 3A, the apparatus 20 contains a first rod member 56 and a second rod member 58. The first rod member 56 will be attached to the attaching means 60, with the attaching means 60 being in this embodiment a combination 62 type of lock. The first rod member is connected to the loop 64.

The first rod member 56 will be connected at the second end 66 to a folding joint means 68. The second rod member 58 has a first end 70 that is attached to the folding joint means 68. The second rod member 58 extends to a locking means 72 for locking the hook means 74 (as seen in FIG. 3B) relative to the second rod member 58, as will be more fully explained in the description of FIG. 4. The locking means 72 is a key type of lock. The locking means 72 concludes at the end 76.

The adjusting means 77 for adjusting the length of the rod member to the dimensions of the automobile of FIG. 3B includes the serration thread profile 78 that cooperates with the end 76 of the locking means 72. The serration thread profile means extends to the cylindrical surface 80 to the actual hook extension 82, with the hook extension also being depicted in FIG. 3C. The serration thread profile is generally a cylindrical surface with a series of parallel grooves thereon. The serration thread profile 78 has the first end 83. The hooking means 74 deviates from the axial orientation of the cylindrical section 80 represented by the numeral 84 which in the preferred embodiment is an angle of deflection of 20 degrees. This angle is necessary in order to properly grasp the brake pedal.

Figure 4:
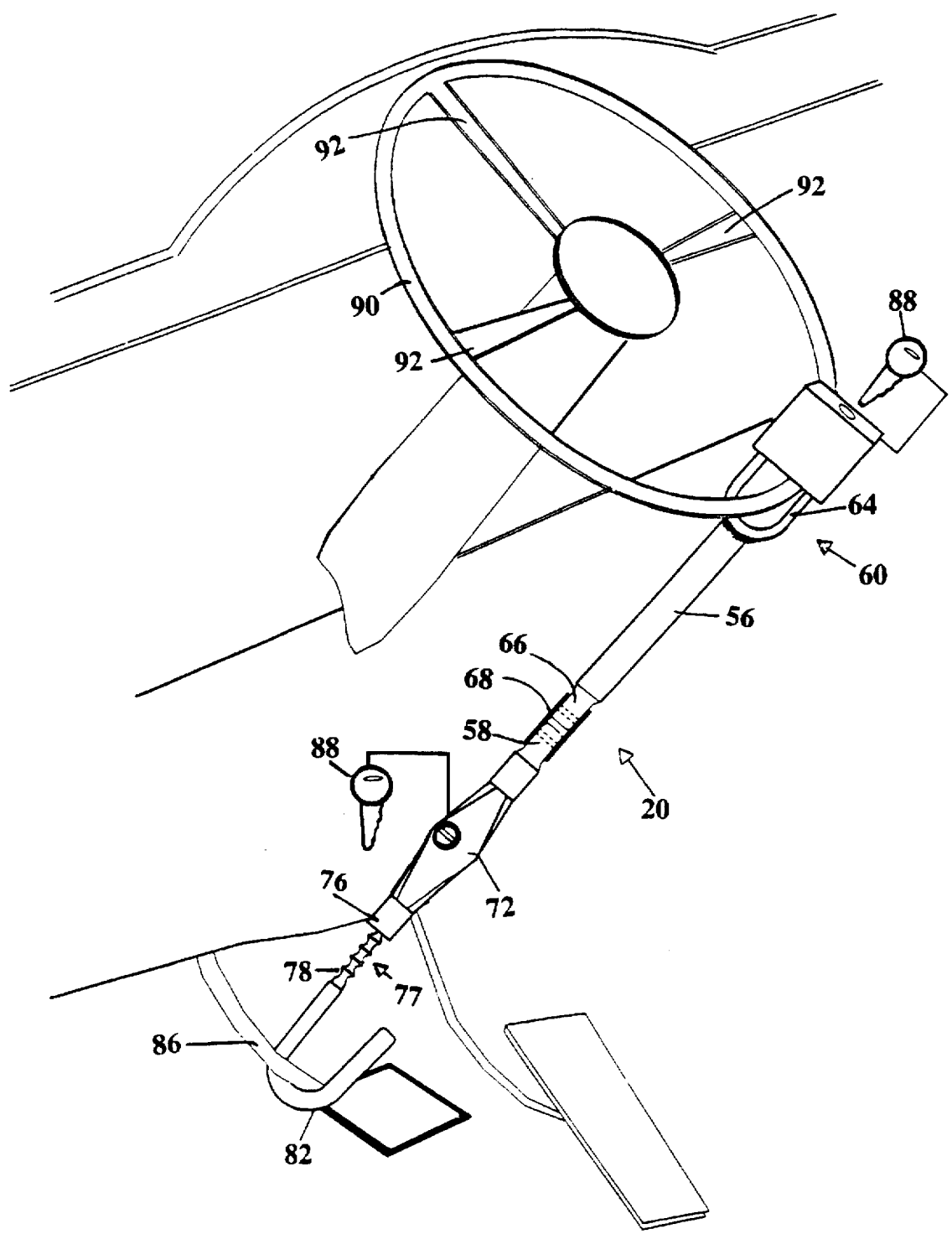
FIG. 4 is an illustrated view of the preferred embodiment of FIGS. 3A–3B.

Referring now to FIG. 4, an illustrated view of the preferred embodiment of FIGS. 3A-3B is shown. It should be noted that like numbers appearing in the various figures refer to like components. Thus, the apparatus 20 contains the hook extension 82 that leads to the adjusting means 77 which includes the serration thread profile 78. The hook extension 82 attaches about the brake pedal 86. The serration thread profile 78 cooperates with the locking means 72 such that the serration thread profile 78 may be telescoped relative to the locking means 72. Once the desired length is achieved, the locking means can be locked with the key 88.

The attaching means 60 will be attached via the loop 64 of the lock about the steering wheel 90 of the vehicle. The attaching means 60 can then be locked in place as seen in FIG. 4. In this position, a would-be thief would not be able to steer the vehicle. For instance, when the thief would attempt to rotate the steering wheel 90, the apparatus 20 is a fixed length and the loop 64 of the lock would abuts the spokes 92 of the steering wheel 90.

Also, since the apparatus 20 is at a fixed length, and with one point connected to the steering wheel 90 via the attaching means 60, it is not possible maneuver the hook extension 82 away from the brake pedal 86. In order to release the apparatus 20 from engagement, the operator may unlock the attaching means 60 and release the loop 64 from engagement with the steering wheel 90. Thereafter, the operator may unhook the hook extension 82 from the brake pedal 86. Alternatively, the serration thread profile 78 can be unlocked via the locking means 72 and the hook extension 82 can disengaged from the brake pedal 86. The operator may then fold the apparatus (via the folding means 68) and store the apparatus 20 in accordance with the teachings of this invention.

Changes and modifications in the specifically described embodiments can be carried out without departing from the scope of the invention which is intended to be limited only by the scope of the appended claims.

I claim:

1. An apparatus for deterring auto theft comprising:

hooking means for hooking onto a brake;

a rod member extending from said hooking means, wherein said rod member contains a first telescopic member and a second member of a fixed length;

attaching means for attaching said rod member onto a steering wheel;

first locking means, operably associated with said attaching means, for locking said attaching means onto the steering wheel;

adjusting means, cooperating with said first telescopic member and having a dimension from said brake to said adjusting means, for adjusting the length of said first telescopic member according to the dimension of the brake to said adjusting means;

a folding joint means, operatively associated with said first telescopic rod member and said second rod member, for folding said first telescopic rod member relative to said second rod member;

second locking means, operatively associated with said adjusting means, for locking said first telescopic member at a certain length.

2. The apparatus of claim 1 wherein said hooking means has a first end containing a hook and a second end containing thread means, and wherein said first end deviates from the axial orientation of said telescopic rod member at an angle of deflection of 20 degrees, and wherein said first telescopic rod member contains thread means and wherein said adjusting means includes:

said thread means of said hooking means cooperating with said thread means of said first telescopic rod member so that the length of said first telescopic rod may be varied according to the dimension of the brake to said adjusting joint means.

3. The apparatus of claim 1 wherein said hooking means has a first end containing a hook and a second end containing a serration thread profile, and wherein said first end deviates from the axial orientation of said telescopic rod member at an angle of deflection of 20 degrees, and wherein said first telescopic rod member contains a serration thread profile and wherein said adjusting means includes:

said serration thread profile of said hook cooperating with said serration thread profile of said first telescopic rod member so that the length of said rod may be varied according to the dimension of the brake to said adjusting joint means.

4. An anti-theft device for vehicles comprising:

a catch member adapted to catch onto a brake pedal located with the vehicle;

a rod member containing a first telescopic rod section extending from said catch member and a second rod section having a fixed length;

an attachment member, fixedly mounted on said second rod section, adapted to attach to a steering wheel located within the vehicle; and, first locking means, operably associated with said attachment member, for locking said attachment member onto the steering wheel;

a folding joint having a dimension from said brake pedal to said folding joint, said folding joint being adapted to connect said first telescopic rod section and said second rod section so that said first telescopic rod section and said second rod section may be folded about said folding joint;

adjusting means, adapted to said telescopic rod section, for adjusting the length of said first telescopic rod section according to the dimensions of said brake pedal to said folding joint;

second locking means, operatively associated with said adjustment means, for locking said first telescopic member at a certain length;

and wherein said catch member deviates from the axial orientation of said telescopic rod member of an angle of deflection of 20 degrees.

* * * * *